United States Patent [19]

Andrea

[11] Patent Number: 4,867,415
[45] Date of Patent: * Sep. 19, 1989

[54] VALVE APPARATUS AND METHOD OF OPERATING THEREOF

[76] Inventor: Frederic E. Andrea, 13375 N. 100th Pl., Scottsdale, Ariz. 85260

[ * ] Notice: The portion of the term of this patent subsequent to Oct. 25, 2005 has been disclaimed.

[21] Appl. No.: 216,601

[22] Filed: Jul. 8, 1988

Related U.S. Application Data

[63] Continuation-in-part of Ser. No. 909,785, Sep. 18, 1986, Pat. No. 4,779,840.

[51] Int. Cl.$^4$ ............................................... F16K 25/00
[52] U.S. Cl. ..................................... 251/337; 251/288
[58] Field of Search ................ 251/174, 288, 315, 337

[56] References Cited

U.S. PATENT DOCUMENTS

| | | | |
|---|---|---|---|
| 2,890,017 | 6/1959 | Shafer | 251/174 |
| 2,930,575 | 3/1960 | Britton | 251/174 |
| 2,973,182 | 2/1961 | Gill | 251/174 |
| 3,533,597 | 10/1970 | Bolling | 251/174 |
| 4,460,157 | 7/1984 | Marchal | 251/315 |
| 4,779,840 | 10/1988 | Andrea | 251/174 |

Primary Examiner—John C. Fox
Attorney, Agent, or Firm—Armstrong, Nikaido, Marmelstein, Kubovcik & Murray

[57] ABSTRACT

An improved valve apparatus and a method of operation thereof having a spring retainer member means suitable for accommodating a spring means therein for operably coupling thereabove a pipe coupling body means are disclosed. Inside the pipe coupling body means is a ball headed member means having an aperture passing therethrough for blocking off or allowing passage of medium through the pipe coupling body means. The spring retainer member means is turned in one direction in order to allow unimpeded passage or to control the amount of flow thereof of said medium and can be rapidly and efficiently sprung back to its original position in order to completely block off the passage of said medium through the pipe coupling body means for a rapid and efficient "on-off" control thereof.

3 Claims, 5 Drawing Sheets

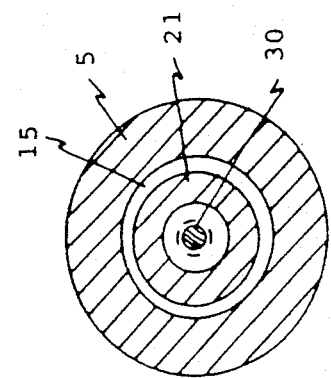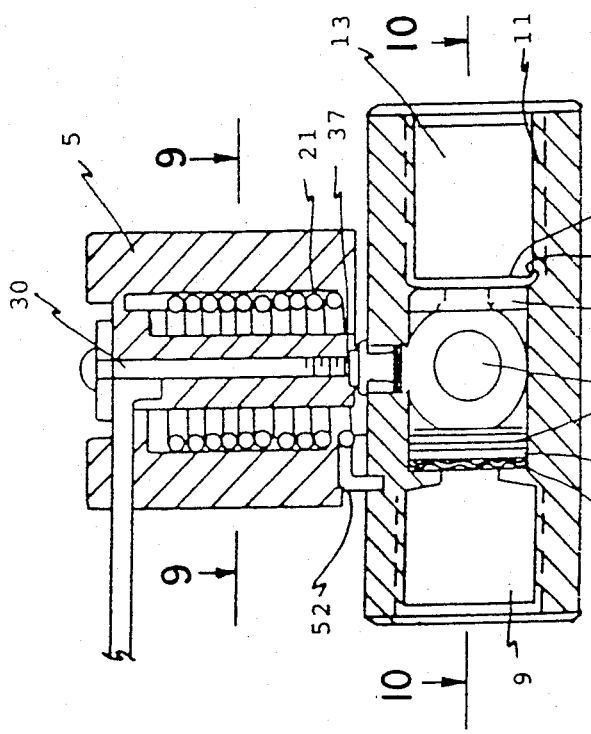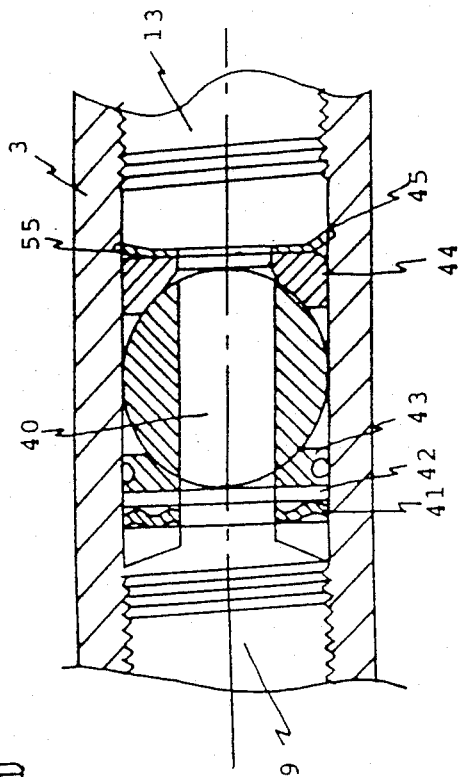

VALVE APPARATUS AND METHOD OF OPERATING THEREOF

REFERENCE TO RELATED APPLICATION

This application is a continuation-in-part of application U.S. Ser. No. 909,785, now U.S. Pat. No. 4,779,840, filed Sept. 18, 1986, the disclosure of which is incorporated by reference herein as if fully set forth.

BACKGROUND AND SUMMARY OF THE INVENTION

This invention generally relates to an improved valve apparatus and a method of operating thereof which has a spring retainer member suitable for accommodating a spring member therein for operably coupling thereabove a pipe coupling body. Inside the pipe coupling body is a ball headed member operably coupled to the spring retainer member suitable for blocking or allowing medium passage through the pipe coupling body.

The instant invention uses at least one seat member abutting the ball headed member. The seat member is preferably made of teflon or the like. The seat member has a substantially flat front surface which allows for more points of contact between the seat member and the ball headed member, thus resulting in a higher sealing capacity.

Other objects and advantages of the valve apparatus of the instant invention will become apparent from the following description when considered in conjunction with the accompanying drawings.

BRIEF DESCRIPTION OF THE DRAWINGS

FIG. 8 is a cross-sectional view of the improved valve of the present invention when fully assembled.

FIG. 9 is a cross-sectional view taken along line 9—9 of FIG. 8 of a spring retainer member witha spring member therein.

FIG. 10 is a cross-sectional view taken along line 10—10 of FIG. 8 of a pipe coupling body with a plurality of internal parts housed therein.

DETAILED DESCRIPTION OF THE INVENTION

FIGS. 7-15 are illustrated as FIGS. 1-9 in U.S. Ser. No. 909,785, and fully described in U.S. Ser. No. 909,785, filed Sept. 18, 1986 which, as indicated above, is incorporated by reference herein as if fully set forth.

Figure 1:
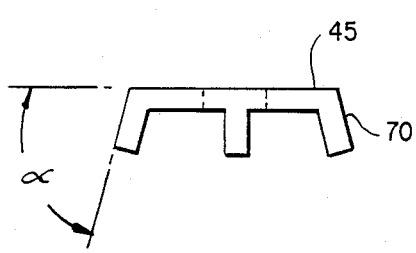
FIG. 1 is a side elevational view of an embodiment of a retainer member.
Figure 5:
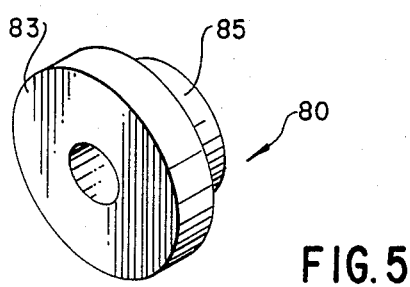
FIG. 5 is a perspective view of an embodiment of a seat member of the instant invention.

The previously described retainer member 45 (in U.S. Ser. No. 909,785) can take the configuration as shwon in FIG. 1. In FIG. 1, the protruding portions or wings 70 may extend between 80° to 90°.

the previously described fourth washer member 44 may take a configuration whereby the seating surfade (i.e., the surface contacting of a concave shaped surface as illustrated in FIG. 5 of U.S. Ser. No. 909,785. The substantially flat surface allows for more poin.ts of contact between the washer member 44 and the ball headed member 33, thus resulting in a higher sealing capacity.

Figure 2:
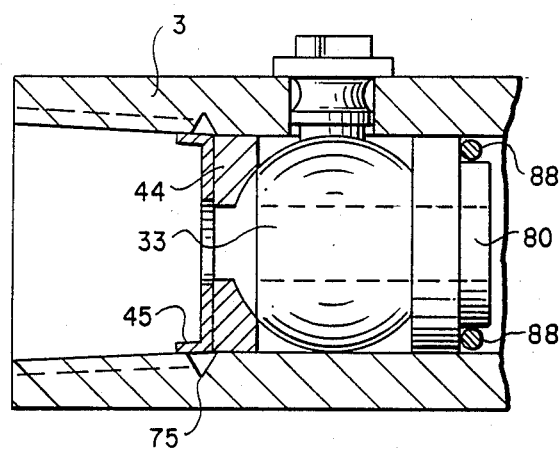
FIG. 2 is a cross-sectional view of a pipe coupling body with a plurality of internal parts housed therein, including one embodiment of the retainer member.

When the retainer member 45 as described in FIG. 1 is assembled into the pipe coupling body 3 along with the ball headed member 30 as shwon in FIG. 2, the retainer member 45 is dropped into the pipe coupling body 3 and a round pin (not shown) is used to force or push the retainer member 45 therein so that the wins 70 snap into the internal groove portion 75 of the pipe coupling body 3. Alternatively, an air pressure device (not shown) can be used for forcing or pushing the retainer member 45 into the pipe coupling body 3. The snapping of the wings 70 into the internal groove portion 75 allows the holding or the locking in of the internal components within the pipe coupling body 3.

Figure 3:
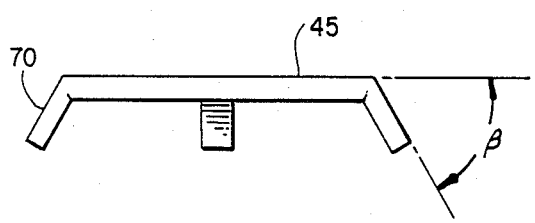
FIG. 3 is side elevational view of another embodiment of the retainer member.
Figure 4:
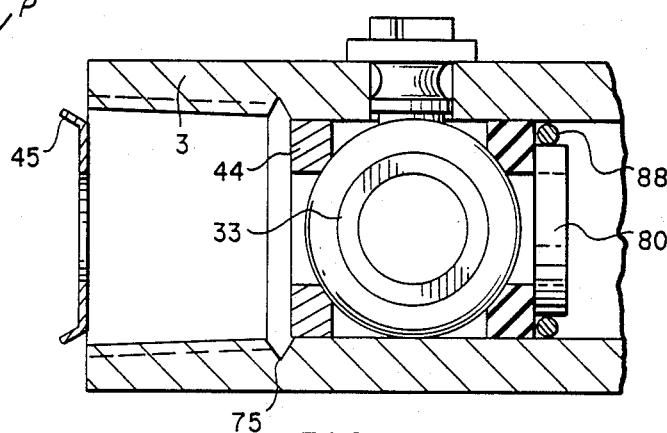
FIG. 4 is a cross-sectional view of the pipe coupling body with the plurality of internal parts housed therein, including another embodiment of the retainer member.

In an alternative arrangement shown in FIG. 3, the retainer member 45 may have the protruding portions or wings 70 extend at an angle $\beta$, whereby $\beta$ can be approximately 45°. As shown in FIG. 4, the retainer member shown in FIG. 3 is forced, pushed or pressed into the pipe couplig body 3 with a pin (not shown) which then bends the wings 70 to approximately 70°. Another pin (not shown) may be used to snap the wings 70 back into the internal groove portion 75, thereby holding or locking in the internal components within the pipe coupling body 3. As previously described, an air pressure device (not shown) can be used for forcing or pushing the retainer member 45 into the pipe couplig body 3.

Figure 11:
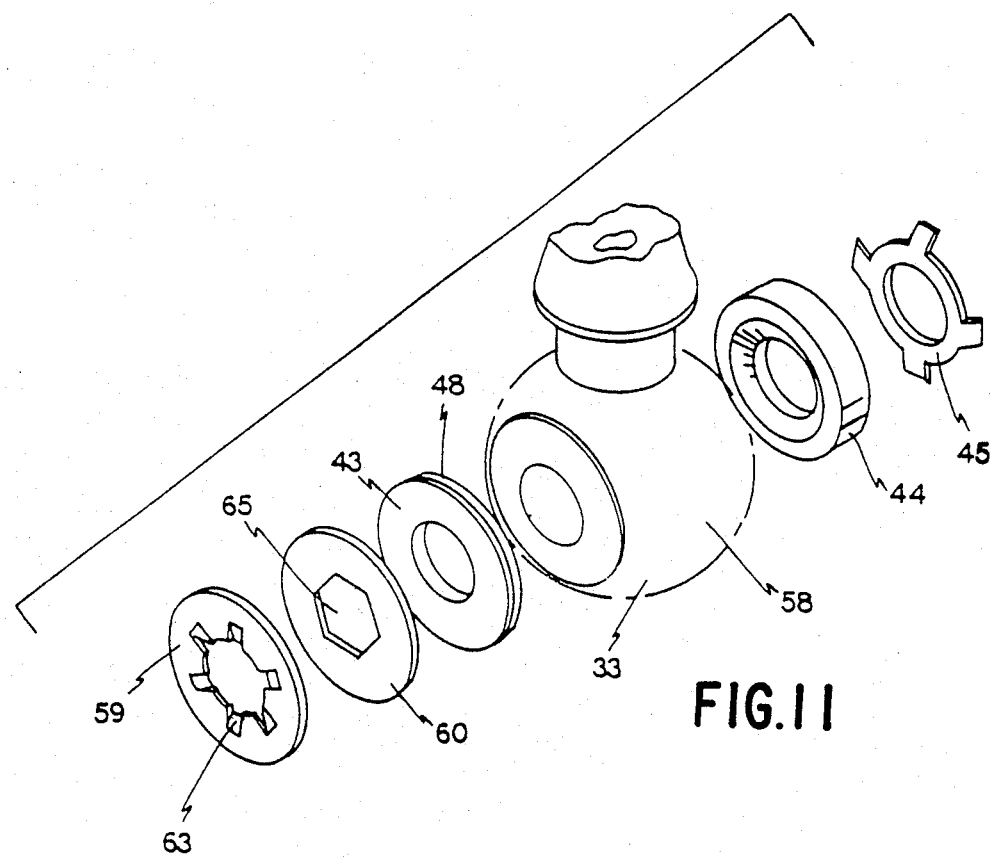
FIG. 11 is an exploded view showing the manner in which a first alternative inside washer having a plurality of integral spring means and an adjacent washer seal backup member are assembled proximate a ball headed member.
Figure 12:
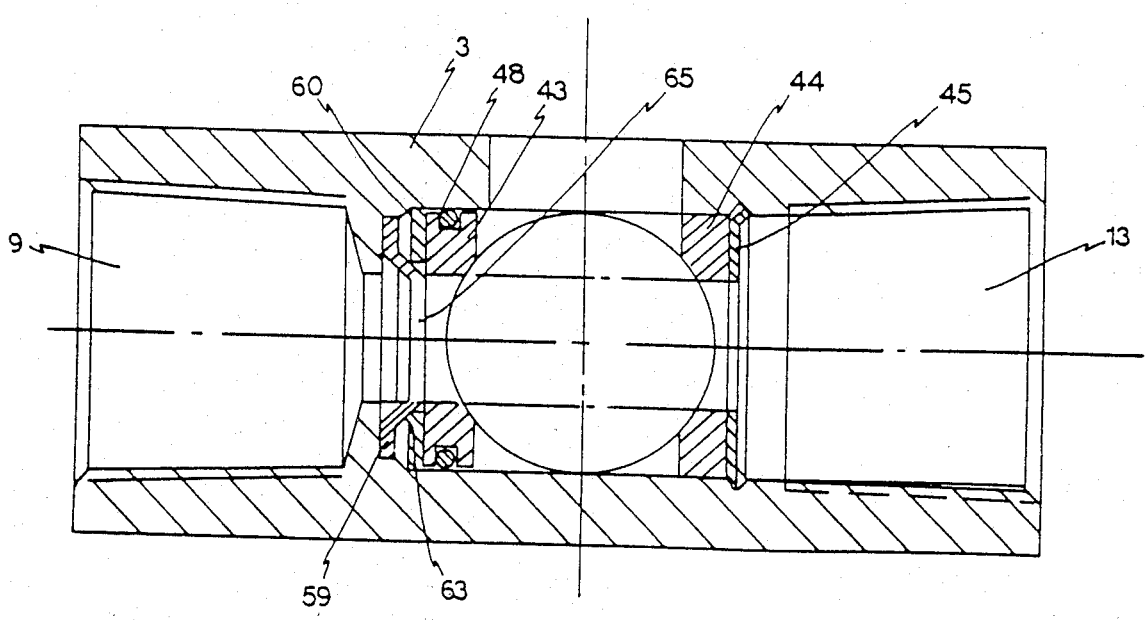
FIG. 12 is a cross-sectional view of a fully assembled improved valve of the present invention with the first alternative inside washer and the adjacent washer seal-backup member in use.
Figure 14:
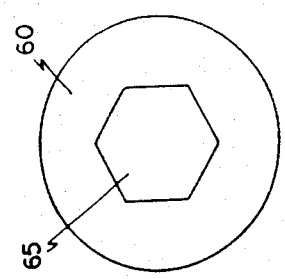
FIG. 14 is a top elevational view of a washer seal backup member.
Figure 13:
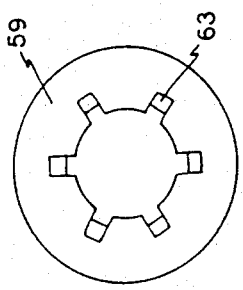
FIG. 13 is a top elevational view of the first alternative inside washer.
Figure 15:
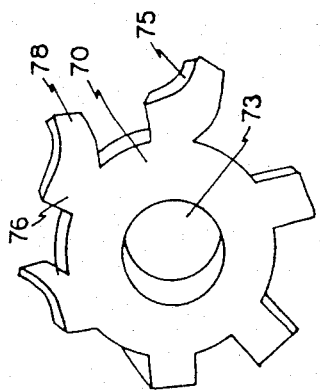
FIG. 15 is a perspective view of a second alternative inside washer having a plurality of integral spring means extending therefrom.

The first 41, second 42 and third 43 washers (as shown in FIG. 1 of U.S. Ser. No. 909,785) or alternative washer member 59, the seal backup washer member 60 and the third washer 43 (as shown in FIG. 5 of U.S. Ser. No. 909,785) can be replaced or combined with a seat member 80 shown in FIG. 5. The seat member 80 is preferably made of teflon or the like. The seat member 80 preferably has a substantially flat front face 83 and an extending portion 85. The flat front face 83 preferably abuts the ball headed member 33 as shown in FIGS. 11 and 13. The extending portion 85 preferably accommodates thereon an O-ring 88 as shown also in FIGS. 2 and 4.

Figure 6:
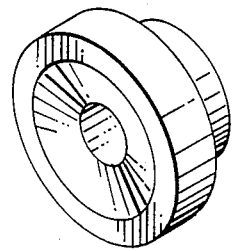
FIG. 6 is a perspective view of a seat member of the prior art.
Figure 7:
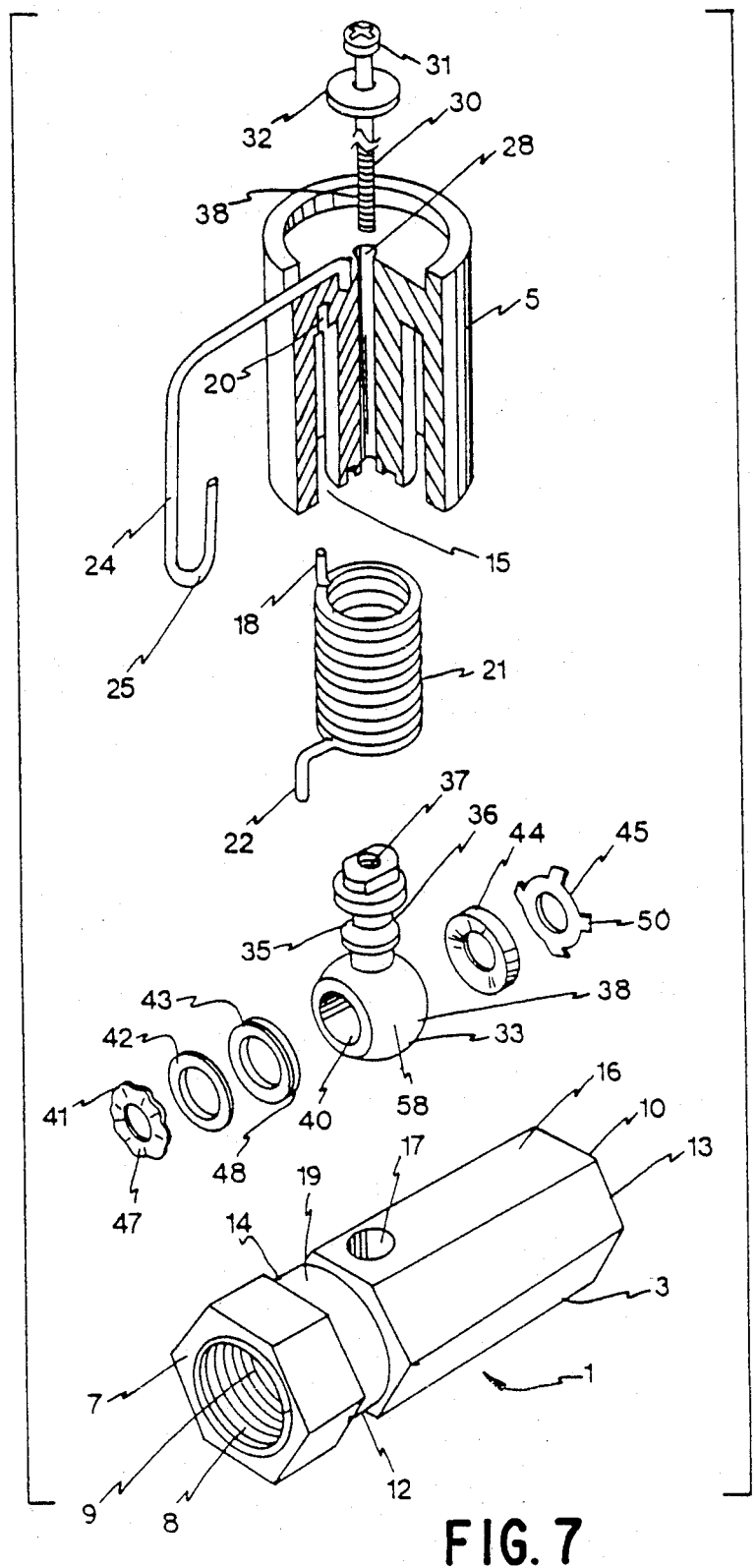
FIG. 7 is an exploded view of an improved valve of the present invention showing a plurality of internal and external parts thereof.

The prior art seat member shown in FIG. 6 has a spherically shaped or concave front face which requires extensive work or operation. Moreover, the machining or finishing of the spherically shaped or concave front face is dimensionally difficult to achieve or maintain.

The substantially flat front surface 83 of the instant invention allows for more points of contact between the seat member 80 and the ball headed member 33, thus resulting in a higher sealing capacity. Moreover, the flat front surface 83 also conforms very well with different types of ball headed members.

While the invention has been particularly shown and described in reference to preferred embodiments thereof, it will be understood by those skilled in the art that changes in form and details may be therein without departing from the spirit and scope of the invention.

What is claimed is:

1. A valve, comprising:
a pipe coupling body means for connecting to at least one pipe member means, said pipe coupling body means has a longitudinal aperture passing therethrough its axis, said pipe coupling body means further has at least one aperture passing therethrough generally perpendicular to said axis;
a ball headed member means being accommodated inside said pipe coupling body means for controlling flow of medium passing therethrough, wherein said ball headed member has a stem portion joined thereto for passing through said aperture generally perpendicular to said axis of said pipe coupling body means;
a spring retainer member means for housing a spring means therein operably coupled to said pipe coupling body means and said ball headed member means, wherein said spring retainer member means has a portion for accommodating said spring means when said spring retainer means travels through an ON/OFF position of said valve, and wherein said spring retainer comprises an external stop means for positioning the ON or OFF location of said valve while engaging a portion of said spring means coupled to said pipe coupling body;
a plurality of inside washer means for seating on a first side of said ball headed means, wherein said plurality of inside washer means comprises at least one first seat member having a substantially flat surface abutting said first side of said ball headed member means;
at least one outside washer for seating on a second side of said ball headed member means;
at leat one ball retainer member means placed adjacent said at least one outside washer means for keeping said ball headed member means inside said pipe coupling body means;
a handle member integrally coupled thereabove said spring retainer member means for operating said spring retainer member means; and
a bolt which passes through said spring retainer member means for directly connecting with said stem portion.

2. The valve as in claim 1, wherein said first seat member accommodates at least one O-ring.

3. The valve as in claim 1, wherein said at least one outside washer comprises a second seat member having a substantially flat surface abutting said second side of said ball headed member means.

* * * * *